United States Patent [19]

Glenn

[11] Patent Number: 4,818,102
[45] Date of Patent: Apr. 4, 1989

[54] ACTIVE OPTICAL PYROMETER

[75] Inventor: William H. Glenn, Vernon, Conn.

[73] Assignee: United Technologies Corporation, Hartford, Conn.

[21] Appl. No.: 945,158

[22] Filed: Dec. 22, 1986

[51] Int. Cl.$^4$ ............................................. G01J 5/48
[52] U.S. Cl. .................................. 356/43; 356/45; 374/121
[58] Field of Search ................ 356/45, 48, 43, 47; 374/121, 126, 127, 129, 128

[56] References Cited

U.S. PATENT DOCUMENTS

| | | | |
|---|---|---|---|
| 3,057,200 | 10/1962 | Wood | 356/43 |
| 3,698,813 | 10/1972 | Aisenberg | 356/48 |
| 4,278,349 | 7/1981 | Sander | 374/121 |
| 4,313,344 | 2/1982 | Brogardh et al. | 374/126 |
| 4,417,822 | 11/1983 | Stein et al. | 356/45 |
| 4,493,553 | 1/1985 | Korb et al. | 356/45 |
| 4,522,510 | 6/1985 | Rosencwaig et al. | 356/43 |
| 4,634,290 | 1/1987 | Rosencwaig et al. | 374/121 |
| 4,708,493 | 11/1987 | Stein | 356/45 |

FOREIGN PATENT DOCUMENTS

| | | | |
|---|---|---|---|
| 2153077 | 4/1973 | Fed. Rep. of Germany | |
| 0222730 | 12/1984 | Japan | 374/121 |

OTHER PUBLICATIONS

DeWitt et al., "Theory and Technique for Surface Temperature Determinations by Measuring the Radiance Temperatures and the Absorption Ratio for two Wavelengths", *Temp. Measurement and Control in Science and Industry* 1972, pp. 599-610.

Nutter, "Radiation Thermometry", *Mechanical Engineering* 7/72, pp. 12-15.

Gardner et al., "Multi-Wavelength Radiation Pyrometry Where Reflectance is Measured to Estimate Emissivity", *Journal of Physics E. Scient. Instrum.* vol. 13, 1980, pp. 306-310.

Brandt, "Thermal Diffusivity of Solids-Analysis of a Modulated Heating Beam Technique", *High Temp.-High Pressures* vol. 11, No. 1 1979, pp. 59-68.

Primary Examiner—Richard A. Rosenberger
Assistant Examiner—Michael Messinger
Attorney, Agent, or Firm—Eric W. Petraske

[57] ABSTRACT

An optical pyrometer makes a temperature measurement of a remote body that is insensitive to spurious radiation by modulating the temperature of the body of optical irradiation in a first optical wavelength range at a low modulation frequency and synchronous detection of emitted optical radiation in a second optical wavelength range, together with modulation in the second optical wavelength range and detection in the first wavelength range. The measurement so made are combined to form a parameter representative of the body temperature that is insensitive to the environment of the body.

6 Claims, 1 Drawing Sheet

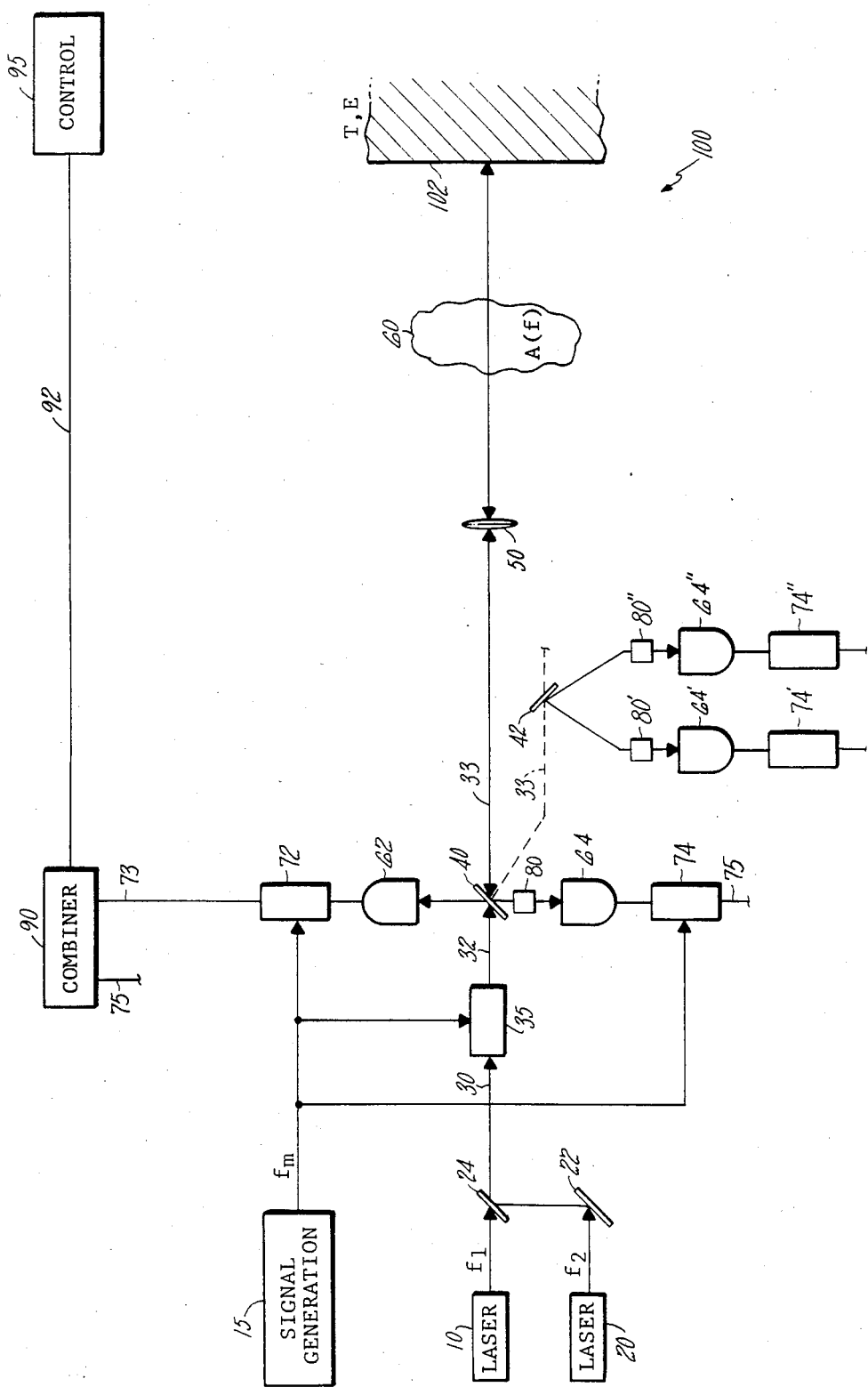

ACTIVE OPTICAL PYROMETER

TECHNICAL FIELD

The field of the invention is that of optical pyrometry, in which the temperature of a remote body is determined by measuring the amount of radiation given off by it.

BACKGROUND ART

In the prior art, optical pyrometers have been able to calculate the temperature of a remote body by means of measuring the radiation given off by that body and applying the measured numbers to a well known formula. Complications have arisen because the emissivity of the surface and its dependence on wavelength has an effect on the calculation but it is generally not known. Other unknowns include the reflectivity of the surface and the level of extraneous radiation on the surface. The properties of the medium between the surface being measured and the sensor are not known and may vary as a function of wavelength and also as a function of time.

Remote pyrometry is often used in hostile environments, where there is a great deal of spurious radiation from a flame or from hot elements other than the subject of the investigation. In that case, it is difficult or impossible to separate the radiation that is emitted from the body from spurious radiation that is reflected from the body by techniques known in the prior art.

U.S. Pat. No. 4,417,822 illustrates an approach in which a laser irradiates a surface and a detector responsive to a narrow band of radiation employs heterodyne optical detection in an attempt to measure concurrently the radiance and the emissivity of the subject surface. U.S. Pat. No. 3,698,813 illustrates a pyrometer in which the surface is irradiated with modulated light from the remote sensor and the intensity of the reflected light from that surface is measured, thus correcting for the reflection of the remote surface. Both of these devices in the prior art are unable to correct for the properties of the medium between the sensing device and the surface. The use of a narrow spectral range also means that the results depend on the collection optics.

DISCLOSURE OF THE INVENTION

The invention relates to an active optical pyrometer in which an incident beam of radiation at a first optical wavelength irradiates the surface being measured, heating that surface slightly. The intensity of the radiation is modulated at a relatively low frequency, producing a modulation of the temperature of the surface. Emitted radiation at a second optical wavelength, modulated with the same modulation frequency as the first wavelength, is detected and reflects the modulated radiation given off as a result of heating the surface. The surface is then irradiated at the second wavelength and the emitted radiation at the first wavelength is detected in a similar manner. By combination of the input power at the first and second wavelengths and the detected power at the first and second wavelengths, it is possible to derive a measurement of the temperature of the surface that does not depend on the level of extraneous reflected radiation, or on properties of the intervening medium.

BRIEF DESCRIPTION OF THE DRAWING

The FIGURE illustrates, partially schematically, and partially pictorially, an embodiment of the invention.

BEST MODE FOR CARRYING OUT THE INVENTION

Referring now to the FIGURE, a body 100 indicated schematically and having a surface 102 has a temperature T and an emissivity E that will depend on the wavelength or frequency of the radiation in question. This surface is surrounded by an absorbing medium indicated by the numeral 60 and having an absorptivity A(f) that interferes with the measurement. On the left of the diagram, light sources 10 and 20, illustratively first and second dye lasers having frequencies f1 and f2, produce output beams that are combined by mirror 22 and beam splitter 24 to form a combined output beam 30. Beam 30 passes through modulation device 35, emerging as modulated beam 32 which then passes through beam splitter 40, a portion being reflected into detector 62 to measure the input power and the remainder traveling on as beam 30 through focusing optics 50 and then striking surface 102. Thermally emitted radiation at frequency f2 travels back along the same path through optics 50 and is reflected from beam splitter 40 through filter 80 into detector 64. Thus, the system is able to measure the input power coming from the optical source and the thermally emitted at the appropriate frequency.

Many different variations of the invention may be constructed and a simplified version is illustrated in this drawing. Modulation device 35 may be a mechanical chopper or a crystal that can be modulated electrically. It is modulated at frequency $f_m$ in signal generator 15. Signal $f_m$ is fed not only to modulation device 35 but also to electronics modules 72 and 74 which process the signals from detector 62 and 64 respectively.

Illustratively, light sources 10 and 20 are turned on in sequence and the same modulation frequency is used for both light sources. In that case, the input power detected by detector 62 will be modulated at frequency $f_m$ and the irradiated power reflected off beam splitter 40 from return beam 33 is selected by filter 80 to have a band width about frequency $f_2$. This same modulation frequency $f_m$ is also fed into electronics module 74 so that the modulated emitted radiation at frequency $f_2$ may be detected within module 74 which produces a signal emerging on line 75. This signal on line 75 is combined with the signal on line 73 representing the magnitude of the input power at frequency $f_1$ in combiner 90 which may be any convenient device and is illustratively a digital computer. As will be described later, these two signals on lines 73 and 75 are combined to produce an intermediate calculation that is stored until the second set of numbers is generated.

A second measurement is done with frequency $f_2$ from light source 20 being operative and a corresponding set of signals representing the power of light source 20 and the signal returned at frequency at $f_1$ are also combined in combinder 90. In order to accomplish this, filter 80 may be a dichroic filter that passes radiation in the two wavelengths about $f_1$ and $f_2$ or, alternatively, it may be a different grating directing radiation into two detectors 64 and 64', say.

Operating parameters will vary according to the particular apparatus that is to be measured, but the modulation frequency is conveniently of the order of 10-100 Hz and the laser power should be sufficient to raise the temperature of the object of the order of ten degrees near the probe spot location.

Combiner 90 may be a simple set of analog circuits or, since computers are so inexpensive nowadays, it may be a low cost digital computer.

Combiner 90 produces an output signal on line 92 that may be used to control a controlling device 95 that performs any convenient function, such as maintaining the temperature of the surface 102. In operation then, controller 95 would control a heating mechanism omitted from the diagram for simplicity that would respond to the temperature signal on line 92 to increase or decrease the heat to the body 100 in order to maintain the surface temperature 102 constant. Alternatively, if the function to be performed by the system is a measurement only, then the signal on 92 would be recorded for whatever purpose was required.

Those skilled in the art will readily be able to construct many embodiments of the invention using the information supplied. For example, if speedy response is important, light sources 10 and 20 may be modulated at frequencies $f_{m'}$ and $f_{m''}$ respectively with the same modulation frequencies fed to the corresponding one or two detectors so that the four measurements of input and emitted powers may be made simultaneously.

A hot body at a temperature T emits radiation (Watts/meter) at a frequency f (Wavelength $L=c/nf$) according to the relation $$P_E = B\, E(f) \frac{f^3}{(e^{+hf/kT} - 1)}$$

Here E(f) is the emissivity and $B=2\pi h n^2/c^2$, n=refractive index of the surrounding medium. For visible or near IR radiation and for any reasonable temperature, $hf > kT$, so that the approximation $$P_E \approx B\, E(f) f^3 e^{-hf/kT}$$

may be used. If the temperature is modulated by dT, we have $$dP_E = B\, E(f) f^3 \frac{hf}{kT^2}\, dT\, e^{-hf/kT}$$

$$\frac{dP_E}{P_E} = \frac{hf}{kT}\, \frac{dT}{T}$$

so that a fractional change in temperature $dT/T$ leads to a fractional change in radiated power $dP_E/P_E$ that is larger by the ratio $hf/kT \approx 8$ for $T=3000°$ K. and $hf=2$ ev.

Those skilled in the art will appreciate that, if modulated radiation with a peak modulation power $dP_A$ is absorbed on the surface at the focal spot in FIG. 1, the temperature of the spot will be modulated by an amount $$dT = D\, dP_A \tag{1}$$

where D is a constant characterizing the thermal properties of the surface. As shown below, this will cause a change in the emitted radiation given by $$dP_E(f) = B\, E(f) f^3 \frac{hf}{kT^2}\, D\, dP_A\, e^{-hf/kT} \tag{2}$$

We now consider the case where the source is operated at a wavelength $L_1$, or frequency f1, $L_1(f_1)$ and the observation is made at $L_2(f_2)$. The power absorbed is $$dP_A = G A(f_1) a(f_1) dP_O(f_1) \tag{3}$$

Where $A(f_1)$ is the attenuation of the intervening medium at $f_1$ and $a(f_1)$ is the absorptivity of the surface at $f_1$. The quantity $dP_O(f_1)$ is the transmitted power and G is a geometrical factor characterizing the optics. The power collected at $f_2$ is $$dP_R(f_2) = G A(f_2) \underbrace{B E(f_2) f_2^3 \frac{hf_2}{kT^2} e^{-hf_2/kT}}_{\text{Radiated Power at } f_2 \text{ for } dT} G A(f_1) a(f_1) dP_O(f_1) D \tag{4}$$

(Collection Efficiency) (Radiated Power at $f_2$ for $dT$)

We also note that $a(f_1)=E(f_1)$ by detailed balance (absorptivity=emissivity). We may write then $$dP_R(f_2) = BD\, G^2 A(f_1) A(f_2) E(f_1) E(f_2) \frac{hf_2^4}{kT^2} e^{-hf_2/kT} dP_O(f_1) \tag{5}$$

If the excitation and observation wavelengths are now interchanged, a similar argument gives $$dP_R(f_1) = BD\, G^2 A(f_1) A(f_2) E(f_1) E(f_2) \frac{hf_1^4}{kT^2} e^{-hf_1/kT} dP_O(f_2) \tag{6}$$

We note all the common factors in these two expressions. Taking the ratio gives $$R = \frac{dP_R(f_2)}{dP_R(f_1)} = \left(\frac{f_2}{f_1}\right)^4 e^{-h(f_2-f_1)/kT} \frac{dP_O(f_2)}{dP_R(f_1)} \tag{7}$$

Since the incident powers $dP_O(f_1)$ and $dP_O(f_2)$ are known, R is a unique function of the temperature and is independent of the material properties. This equation may be rewritten as $$R = \frac{f_2^4}{f_1} e^{-h(\Delta f)/kT} R_o$$

where $\Delta f = f_2 - f_1$ $$\log(R/R_o) = 4 \log \frac{f_2}{f_1} - \frac{h\Delta f}{kT} \tag{8}$$

$$\frac{h\Delta f_1}{kT} = 4 \log(f_2/f_1) - \log(R/R_o)$$

$$kT = \frac{h\Delta f}{4 \log(f_2/f_1) - \log(R/R_o)}$$

which gives the temperature explicitly in terms of the measured ratios R and $R_o$ and the known quantities $f_1$ and $f_2$.

Note that, if it is not necessary to calculate the temperature T explicitly, then it is instructive to refer to equation 7. This equation states that the ratio of power emitted at first and second frequencies in response to irradiation of a known power magnitude at second and first frequencies depends on the temperature of the body and some other variables. It could be for simple control applications that combiner 90 could be a sample and hold device together with a conventional division circuit to generate an output signal on line 92 that is a (nonlinear) function only of T. Controller 95 could then respond to that signal as well as to the actual magnitude of the temperature.

An alternative embodiment may be formed that has the advantage of using only a single laser. With this approach, laser 20, mirror 22, and beamsplitter 24 may be eliminated. An alternative detection unit is shown to the right of the main embodiment. A grating 42 receives the deflected return radiation from beamsplitter 40 and directs it toward two filters 80' and 80'', which pass a typical pair of frequency ranges for two-wavelength pyrometry. Detectors 64' and 64'' and modules 74' and 74'' reform the same functions as the unprimed counterparts.

For analysis, note the expression for emitted radiation given above for frequency $f_1$:

$$dP_E(f_1) = BE(f_1)f_1^3 \frac{hf_1}{kT^2} e^{-hf/kT} dT$$

Taking the ratio of this expression for two frequencies $f_1$ and $f_2$, results in the expression:

$$\frac{dP_1}{dP_2} = \left(\frac{E(f_1)}{E(f_2)}\right)\left(\frac{f_1}{f_2}\right)^4 e^{-h(f_1-f_2)/kT}$$

In a particular application, in which the primary problem is the presence of extraneous radiation and the emissivity E(f) depends only weakly on frequency, a useful approximation is to assume that the emissivity is constant and cancel it, leaving an expression that may be solved for T.

I claim:

1. An optical pyrometer for measuring the temperature of an object in an absorbing ambient medium comprising:
    modulated light source means for generating modulated probe radiation having a predetermined source power level, modulation frequency and source optical wavelength;
    means for directing said probe radiation at a predetermined location on said object;
    means for receiving input optical radiation emanating from said object;
    means for measuring the power of said input optical radiation in a predetermined measurement optical wavelength range and at said predetermined modulation frequency, and for forming a first signal representative of an input power magnitude in said measurement optical wavelength range;
    means for forming a second signal representative of said predetermined source power level; and
    means for combining said first and second signals to form an output signal representative of said temperature, characterized in that:
    said modulated light source means includes means for generating first and second probe radiation beams at first and second optical wavelengths having first and second probe power levels respectively sufficient to raise said temperature and said modulated light source means directs said first and second probe radiation beams at said predetermined location;
    said means for forming a signal representative of said predetermined source power level includes means for forming first and second probe power signals representative of said first and second probe power levels of said first and second probe radiation beams;
    said means for measuring said input power magnitude includes frequencey-dependent detection means responsive to radiation of one of said first and second optical wavelengths and further includes means for forming first and second input power magnitude signals representative of said input radiation at said first and second optical wavelengths when said second and first probe radiation beams respectively are directed at said predetermined location, whereby said first input power magnitude represents radiation of said first optical wavelength emitted from said object when irradiated at said second optical wavelength, and said second input power magnitude represents radiation of said second optical wavelength emitted from said object whe irradiated at said first optical wavelength; and
    said means for combining signals combines said first and second input power magnitude signals to produce a ratio signal representative of the ratio of said second to said first input power magnitude and further combines said ratio signal with said first and second probe power signals to produce an output signal representative of said temperature.

2. An optical pyrometer according to claim 1, further characterized in that:
    said modulated light source means includes means for generating said first and second probe radiation beams simultaneously; and
    said means for measuring said input power magnitude includes two detector means for forming said first and second power magnitude signals simultaneously.

3. An optical pyrometer according to claim 2, in which said modulation frequency is on the order of ten Hertz, and said first and second optical wavelengths are in the visible region of the optical spectrum.

4. An optical pyrometer according to claim 1, further characterized in that:
    said modulated light source means and said means for directing probe radiation includes means for sequentially directing said first and second probe radiation beams at said object; and
    said means for measuring said input power magnitude includes means for forming said second input power magnitude signal when said first probe radiation beam is directed at said object and for forming said first input power magnitude signal when said second probe radiation beam is directed at said object.

5. An optical pyrometer according to claim 4, in which said modulation frequency is on the order of ten Hertz, and said first and second optical wavelengths are in the visible region of the optical spectrum.

6. An optical pyrometer for measuring the temperature of an object in an absorbing ambient medium comprising:
  modulated light source means for generating modulated probe radiation having a predetermined source power level, modulation frequency and source optical wavelength;
  means for directing said probe radiation at a predetermined location on said object;
  means for receiving input optical radiation emanating from said object;
  means for measuring the power of said input optical radiation in a predetermined measurement optical wavelength range and at said predetermined modulation frequency, and for forming a first signal representative of an input power magnitude in said measurement optical wavelength range;
  means for forming a second signal representative of said predetermined source power level; and
  means for combining said first and second signals to form an output signal representative of said temperature, characterized in that:
  said means for measuring said input power magnitude includes means for forming first and second input power magnitude signals representative of said input radiation at said first and second optical wavelengths, said input radiation being black-body radiation emitted from said predetermined location in response to heating cause by said modulated probe radiation at said source optical wavelength, which source optical wavelength is different from both of said first and second optical wavelengths, whereby said pyrometer is unaffected by the reflectivity of said object and;
  said means for combining signals combines said first and second input power magnitude signals to produce a ratio signal representative of the ratio of said second to said first input power magnitude to produce an output signal representative of said temperature.

* * * * *